Patented Apr. 10, 1934

1,954,294

UNITED STATES PATENT OFFICE 1,954,294

SUPERIMPOSED COLORED PHOTOGRAPHIC LAYERS

Gerd Heymer, Dessau in Anhalt, Germany, assignor to Agfa Ansco Corporation, Binghamton, N. Y., a corporation of New York No Drawing. Application July 7, 1931, Serial No. 549,327. In Germany July 11, 1930

6 Claims. (Cl. 95—2)

My present invention relates to color photographic and more particularly to such materials requiring the superimposition of a number of differently colored colloid layers.

One of its objects is a new process for manufacturing multiple layer photographic materials for the purpose of color photography.

The other objects of my invention are colored multiple layer photographic materials having improved properties over those hitherto known.

Further objects of the present invention will be seen from the detailed specification following hereafter.

The products made for the purpose set forth in the hitherto known manner frequently suffer from the defect that the dyes with which the layers are colored have a noticeable tendency to diffuse into the adjacent layers.

By this invention this tendency towards diffusion is counteracted by causing a mutual precipitation of acid and basic dyes in the various layers or at the boundaries between the layers. The precipitates are of such a fine grain that they are generally not perceptible as such even under the microscope; on the other hand the size of the particles appears to be sufficient to render free diffusion impossible; in the following the term precipitation is intended to indicate this peculiar property.

It is also possible to use as one component for the precipitation a colorless inorganic or organic substance having the required reaction; that is to say, an acid dye may undergo precipitation with an inorganic or organic base, or a basic dye with an inorganic or organic acid. Generally the appearance of the dye is scarcely altered.

It will be understood that care must be taken in the selection of the substances which are to undergo mutual precipitation, that the product of the precipitation has the color and other properties required. In the simplest case, the procedure may consist in adding to the colloid solution intended for the production of one of the layers first, for example, an acid dye and then a substance of contrary reaction, such as a basic substance, in quantity as nearly as possible electrically equivalent to that of the first component. Obviously also both components which are to take part in the precipitation may be incorporated in the finished colloid layer by immersion in suitable baths. Another procedure consists in dyeing one layer with a single dye, for example, an acid dye, and dyeing the superimposed layer with a dye of contrary reaction, in the case under consideration a basic reaction; mutual precipitation of the two dyes occurs in an exceedingly thin layer at the boundary between the layers, rendering further diffusion of the dyes impossible. In a similar manner the first colloid layer may be dyed with a basic dye, an excess of an acid dye added and the superimposed colloid layer dyed with a basic dye. A third colloid layer may then be superimposed and dyed with an acid dye.

The following examples illustrate the invention:—

Example 1.—50 cc. of one of the usual silver bromide-gelatine emulsions containing about 8 to 10 per cent. of gelatine are mixed with 10 cc. of an aqueous solution of 1 per cent strength of Chrysophenine G (Schulz, Farbstofftabellen 6th ed., No. 304). There are then run in 4 cc. of an aqueous solution of 1 per cent strength of acridine yellow G (Schulz, Farbstofftabellen 6th ed., No. 602). No visible precipitation of the dyes occurs. The solution is then poured in the usual manner on a support. If after the emulsion layer so prepared has been allowed to dry a further colored or uncolored gelatine layer is superimposed on it, there is no appreciable diffusion of the yellow dyes into the superimposed layer.

Example 2.—On the yellow colored colloid layer made as described in Example 1 there may be poured in various ways another colored layer for example a red layer.

(a) To 50 cc. of a silver halide-gelatine emulsion are added 10 cc. of an aqueous solution of 1 per cent strength of Benzo Light Red (Fierz-David, "Künstliche organische Farbstoffe", 1926, pg. 155) and there is then run in, as described in Example 1, 10 cc. of an aqueous solution of 1 per cent strength of acridine yellow G. The colored emulsion thus prepared is poured onto the yellow layer in the usual manner.

(b) The yellow emulsion described in Example 1 is poured with the addition of 24 cc. of the solution of acridine yellow. There is then poured on the layer a second layer prepared as described in (a) but without the addition of the acridine yellow.

(c) If the red color of the second layer is required without admixture with yellow, there are added to the red dyed emulsion, instead of the solution of acridine yellow described in (a), 30 cc. of an aqueous solution of 1 per cent strength of methyl acridine or another colorless basic substance. The second layer is then poured in the same manner.

My invention is not limited to the foregoing examples or to the specific details given therein.

First of all I may use other basic or acid dyes which may be employed in a completely analogous manner. Of the great number of dyes suitable for carrying out my invention I enumerate the following (the numbers given relating to Schulz, Farbstofftabellen 6th edition):—

*Acid dyes.*—Congo red A (307), Chicago blue 6 B (424), Congo fast blue (426) or the dyes being on the market under the trade name Sirius dyes such as Sirius rubine, Sirius pink, Sirius yellow R, Sirius orange G and so on.

*Basic dyes.*—Acridine yellow (602), acridine orange (603), acridine red (569), Capri blue (620), thionine blue (661).

As an organic base used for the precipitation of an acid dye there may be used for instance methylacridine, phenylacridine, naphthylbiguanide.

From the great number of organic acids I prefer to use tannic acid.

A few simple comparative experiments should be made to determine the best kind of the substance of contrary reaction to employ with a particular basic or acid dye in order to obtain the desired coloration in the gelatine emulsion.

What I claim is:

1. A process of manufacturing super-imposed silver halide gelatin layers which comprises applying to a support a silver halide gelatin emulsion layer dyed with a dye selected from the group consisting of basic and acid dyes, and applying to this layer a second silver halide gelatin emulsion layer containing a compound of contrary reaction to that of the dye incorporated in said first layer, whereby in the boundary zone of the contiguous layers a precipitate of said dye in said first layer and said compound of contrary reaction in said second layer is formed which prevents the dye of said first layer and said compound in said second layer from diffusing into the other layer.

2. A process of manufacturing super-imposed silver halide gelatin layers which comprises applying to a support a silver halide gelatin emulsion layer dyed with a dye selected from the group consisting of basic and acid dyes, and applying to this layer a second silver halide gelatin emulsion layer containing a dye of contrary reaction to that of the dye incorporated in said first layer, whereby in the boundary zone of the contiguous layers a precipitate of said dye in said first layer and said dye of contrary reaction in said second layer is formed which prevents the dye of said first layer and said dye in said second layer from diffusing into the other layer.

3. A process of manufacturing super-imposed silver halide gelatin layers which comprises applying to a support a silver halide gelatin emulsion layer colored with acridine yellow G and applying to said silver halide gelatin emulsion layer a second layer, containing benzo-light-red whereby in the boundary zone of the two contiguous layers a precipitate of acridine yellow and benzo-light-red is formed which prevents diffusion of acridine yellow in the layer containing benzo-light-red and of benzo-light-red into the layer containing acridine yellow.

4. A photographic film comprising a support and applied to said support super-imposed light-sensitive silver halide gelatin emulsion layers at least one of said layers containing a dye selected from the group consisting of acid and basic dyes and one of the adjacent layers containing a compound of contrary reaction than the dye incorporated in said first layer, and the boundary zone of said contiguous layers containing the reaction product of said dye and said compound.

5. A photographic film comprising a support and applied to said support super-imposed light-sensitive silver halide gelatin emulsion layers at least one of said layers containing a dye selected from the group consisting of acid and basic dyes and one of the adjacent layers containing a dye of contrary reaction than the dye incorporated in said first layer, and the boundary zone of said contiguous layers containing the reaction product of said dye in said first layer and said dye of contrary reaction in said second layer.

6. A photographic film comprising a support and applied to said support super-imposed light-sensitive silver halide gelatin emulsion layers at least one of said layers containing acridine yellow and one of the adjacent layers containing benzo-light-red and the boundary zone between said two contiguous layers containing the reaction product of benzo-light-red and acridine yellow.

GERD HEYMER.